United States Patent [19]
Pulley et al.

[11] Patent Number: 5,518,837
[45] Date of Patent: May 21, 1996

[54] LITHIUM/METAL SULFIDE CELL POSITIVE TERMINAL FEEDTHRU ASSEMBLIES

[75] Inventors: Christopher J. Pulley, Shaker Hts., Ohio; Steven J. Specht, Valdosta, Ga.

[73] Assignee: Westinghouse Electric Corporation, Pittsburgh, Pa.

[21] Appl. No.: 324,048

[22] Filed: Oct. 17, 1994

[51] Int. Cl.$^6$ .................................................... H01M 2/30
[52] U.S. Cl. ........................... 429/180; 429/183; 429/184
[58] Field of Search .................................... 129/180, 181, 129/183, 184

[56] References Cited

U.S. PATENT DOCUMENTS

| | | | |
|---|---|---|---|
| 4,224,388 | 9/1980 | Sadnick | 429/183 X |
| 4,241,152 | 12/1980 | Klink | 429/183 X |
| 4,508,797 | 4/1985 | Knoedler et al. | 429/184 |
| 4,859,547 | 8/1989 | Adams et al | 429/184 X |

*Primary Examiner*—Stephen Kalafut

[57] ABSTRACT

An improved positive terminal feedthru for a lithium/metal sulfide battery cell is provided which permits electrical access to the positive terminal of the battery cell from outside the case. The positive terminal feedthru assembly includes a first annular compressible seal which is provided about the positive feedthru and abuts the positive terminal. A first bushing is provided around the positive feedthru adjacent to the first compressible seal. A second annular compressible seal is provided about the positive feedthru between the first bushing and the battery case. A second annular bushing is provided about the positive feedthru adjacent the opposite side of the case from the second compressible seal. An annular washer is provided around the positive feedthru adjacent the second annular bushing. This washer maintains a compressive load on the first and second compressible seals to account for expansion and contraction due to temperature cycling.

9 Claims, 1 Drawing Sheet

LITHIUM/METAL SULFIDE CELL POSITIVE TERMINAL FEEDTHRU ASSEMBLIES

BACKGROUND OF THE INVENTION

1. Field of the Invention

This invention relates to improvements in monopolar batteries, and more particularly to an improved positive feedthru terminal seal for lithium / metal sulfide cell assemblies.

2. Description of the Prior Art

Typical cell designs use heavy metal rings to compress a packing powder, typically boron nitride, to provide electrical isolation and sealing of the feedthru terminal. FIG. 1 illustrates such a prior art terminal feedthru seal 10 for positive terminal feedthru 12. The seal 10 includes a distributor plate 14 through which positive terminal feedthru 12 passes and which is maintained below the top cover of the battery cell. A pair of beryllia bushings 16 surround an insulating powder 18. A stainless steel seal body 20 encapsulates powder 18 between bushings 16. A stainless steel washer 22 and stainless steel external retaining ring 24 cap off the top of seal 10. Such a terminal feedthru assembly is relatively bulky and heavy.

There has been a recent need for new battery designs having size and weight restrictions. These restrictions limit cell designs to those having small cross sectional thicknesses and those having light weight. The use of heavy metal items 20, 22 and 24 will not work in the current cell configurations because of the weight and size restrictions imposed thereon. Accordingly, there is a need for an improved cell terminal feedthru.

SUMMARY OF THE INVENTION

An improved positive terminal feedthru assembly for a lithium/metal sulfide battery cell is provided which permits electrical access to the positive terminal of the battery cell from outside the case. The positive terminal feedthru assembly includes a first annular compressible seal which is provided about the positive feedthru and abuts the positive terminal. A first bushing is provided around the positive feedthru adjacent to the first compressible seal. A second annular compressible seal is provided about the positive feedthru between the first bushing and the battery case. A second annular bushing is provided about the positive feedthru adjacent the opposite side of the case from the second compressible seal. An annular washer is provided around the positive feedthru adjacent the second annular bushing. This washer maintains a compressive load on the first and second compressible seals to account for expansion and contraction due to temperature cycling.

DESCRIPTION OF THE PREFERRED EMBODIMENT

An improved positive terminal feedthru assembly is provided in which the heavy metal items and powder used in the prior art feedthru assemblies are replaced with lightweight, preformed ceramic bushings and washers to electrically isolate the terminal feedthru. The packing powder is replaced with compressible seals, thereby sealing the isolation bushing to the cell case and terminal feedthru.

Figure 1:
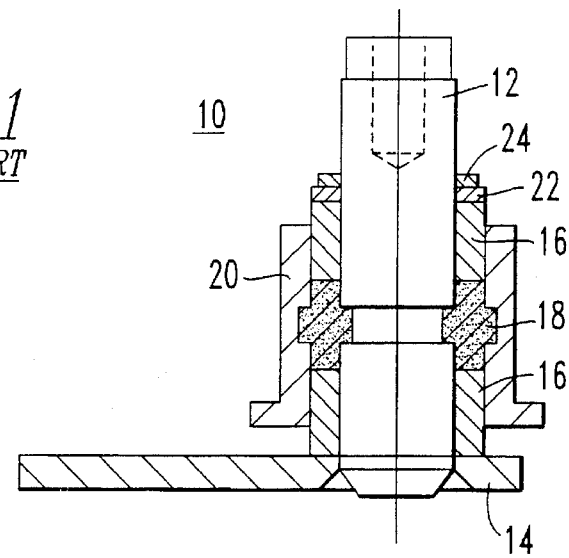
FIG. 1 is a schematic representation of a positive terminal feedthru assembly of the prior art.
Figure 2:
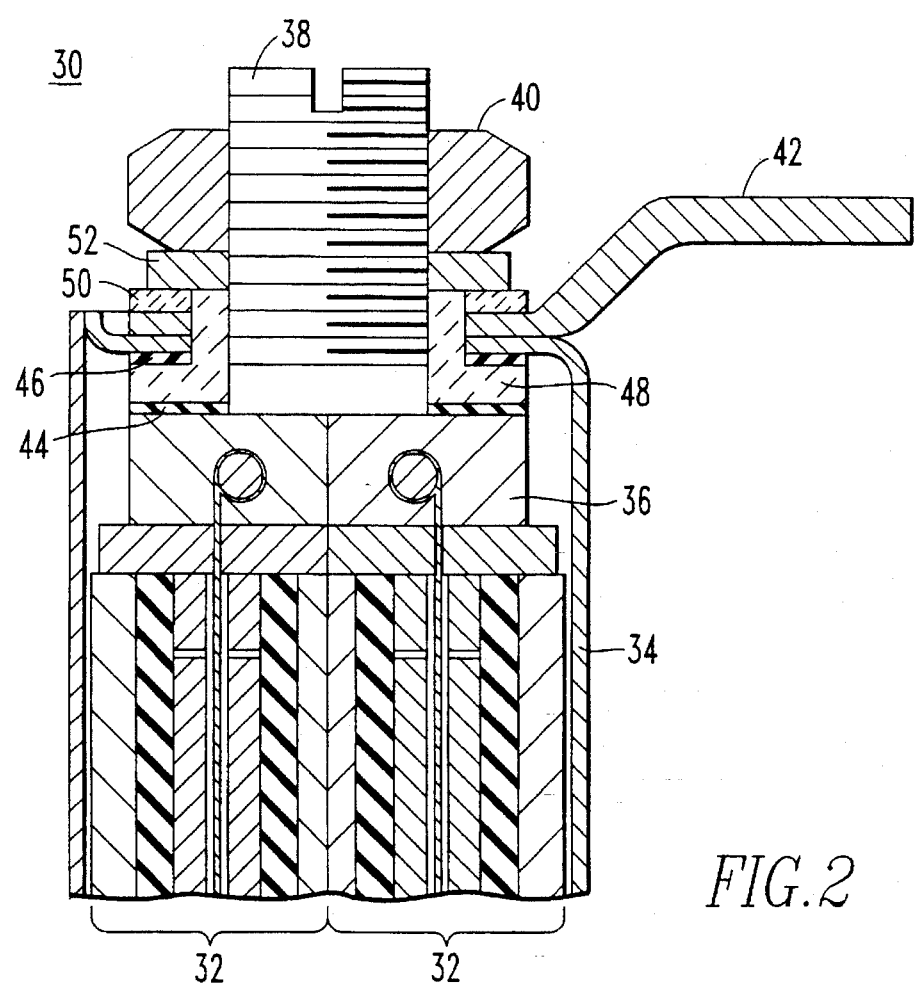
FIG. 2 is a schematic representation of a presently preferred embodiment of the positive terminal feedthru assembly of the present invention.

FIG. 2 shows a 5-plate cell 30 in which two positive electrode plates 32 are provided within case 34. Each electrode plate 32 terminates in a positive terminal 36. Positive feedthru 38 is in electrical contact with positive terminals 36 and provides an access to the positive terminals 36 from outside of case 34. Typical accessories such as jam nut 40 and inter-cell connector 42 can be provided about positive feedthru 38.

The positive terminal feedthru assembly includes a pair of compressible seals 44 and 46 provided about a ceramic isolation bushing 48. The compressible seals 44 and 46 and ceramic isolation bushing 48 are annular shaped and designed to have the positive feedthru 38 pass through the inner diameter thereof. One of the compressible seals 44 separates ceramic isolation bushing 48 from positive terminal 36. The other compressible seal 46 is provided between ceramic isolation bushing 48 and case 34. The positive terminal feedthru assembly further includes a second annular ceramic bushing 50 provided along the outside portion of case 34. A low carbon or stainless steel washer 52 is provided outside of ceramic bushing 50 to maintain the compressive loading on the seals 44 and 46. Stainless steel washer 52 compensates for the difference in thermal expansion of the low carbon steel terminal feedthru.

The compressible seals 44 and 46 used in the improved positive terminal feedthru assembly must be capable of operating at temperatures of approximately 400° C. and for approximately 200 heat and cool down cycles. A variable load must be applied to the seals because of the difference in coefficient of expansion of dissimilar materials. The compressive seals 44 and 46 must be flexible and compress enough to allow for manufacturing imperfections in the steel and ceramic parts so sealing of the positive feedthru terminal will be maintained.

The ceramic bushings 48 and 50 can be made of aluminum nitride, magnesium oxide, yttria, beryllia or any other compatible inert material that provide equivalent electrical isolation characteristics. Compressible seals 44 and 46 can be made of flexible graphite, or any other compatible flexible inert sealing material capable of continuous operation at approximately 400° C. One example of such flexible graphite is the Union Carbide product sold under the trademark "GRAFOIL".

As shown in FIG. 2, ceramic bushing 48 is preferably stepped having a first portion maintained within case 34 and a second portion that extends outward of case 34.

While certain present preferred embodiments have been shown and described, it is distinctly understood that the invention is not limited thereto but may be otherwise embodied within the scope of the following claims.

We claim:

1. A positive terminal feedthru assembly for providing electric access to the positive terminal of a lithium/ metal sulfide battery cell from outside the case of said battery cell comprising:

a. a positive feedthru connected to said positive terminal, said positive feedthru extending from said positive terminal out of said case;

b. a first annular compressible seal provided about said positive feedthru and abutting said positive terminal;

c. a first bushing provided about said positive feedthru, said first bushing provided adjacent said first compressible seal;

d. a second annular compressible seal provided about said positive feedthru, said second compressible seal provided between said first bushing and said case;

e. a second annular bushing provided about said positive feedthru, said second bushing provided adjacent said case opposite said second compressible seal;

f. an annular washer provided about said positive feedthru, said washer provided adjacent said second bushing, said washer maintaining compressive loading on said first and second compressible seals: and g. means for applying a compressire loading on said annular washer.

2. The assembly of claim 1 wherein said first and second compressible seals are formed of flexible graphite.

3. The assembly of claim 2 wherein said first bushing is a ceramic isolation bushing.

4. The assembly of claim 3 wherein said ceramic is selected from the group consisting of aluminum nitride, magnesium oxide, yttria, and beryllia.

5. The assembly of claim 2 wherein said second bushing is a ceramic bushing.

6. The assembly of claim 5 wherein said ceramic is selected from the group consisting of aluminum nitride, magnesium oxide, yttria, and beryllia.

7. The assembly of claim 2 wherein said annular washer is formed of stainless steel and said positive feedthru is formed of a metal having a different coefficient of expansion than said annular washer.

8. The assembly of claim 1 wherein said first bushing is stepped having a first annular portion with a first outside diameter and a second annular portion with a second outside diameter, said second outside diameter being smaller than said first outside diameter, wherein the second portion of said first bushing extends through said case of said cell.

9. The assembly of claim 1 wherein:

a. said positive feedthru includes a threaded portion, and b. said means for applying a compressive loading is a nut threaded on said threaded portion of said positive feedthru.

* * * * *